June 23, 1936.  J. D. ROVICK  2,044,955
DEVICE FOR TESTING GEAR NOISE
Filed July 30, 1932    2 Sheets-Sheet 1

June 23, 1936.　　　J. D. ROVICK　　　2,044,955

DEVICE FOR TESTING GEAR NOISE

Filed July 30, 1932　　　2 Sheets-Sheet 2

Inventor
John D. Rovick

By Whittemore Hulbert Whittemore
 & Belknap
 Attorneys

Patented June 23, 1936

2,044,955

UNITED STATES PATENT OFFICE 2,044,955

DEVICE FOR TESTING GEAR NOISE

John D. Rovick, Detroit, Mich., assignor to National Broach & Machine Company, Detroit, Mich., a corporation of Michigan Application July 30, 1932, Serial No. 626,844

11 Claims. (Cl. 73—51)

The invention relates to apparatus for testing gears as to noise in operation and it is the object of the invention to obtain a construction which is adapted for quickly mounting therein any pair of intermeshing gears to be tested and for then running these gears at high speed. It is a further object to accentuate the noise produced by the gears being tested and to exclude all noise from any other source. With these and other objects in view, the invention consists in the construction as hereinafter set forth.

In the drawings:—

Figure 3 is an end elevation;

Figure 4 is a fragmentary top plan view.

Figure 1:
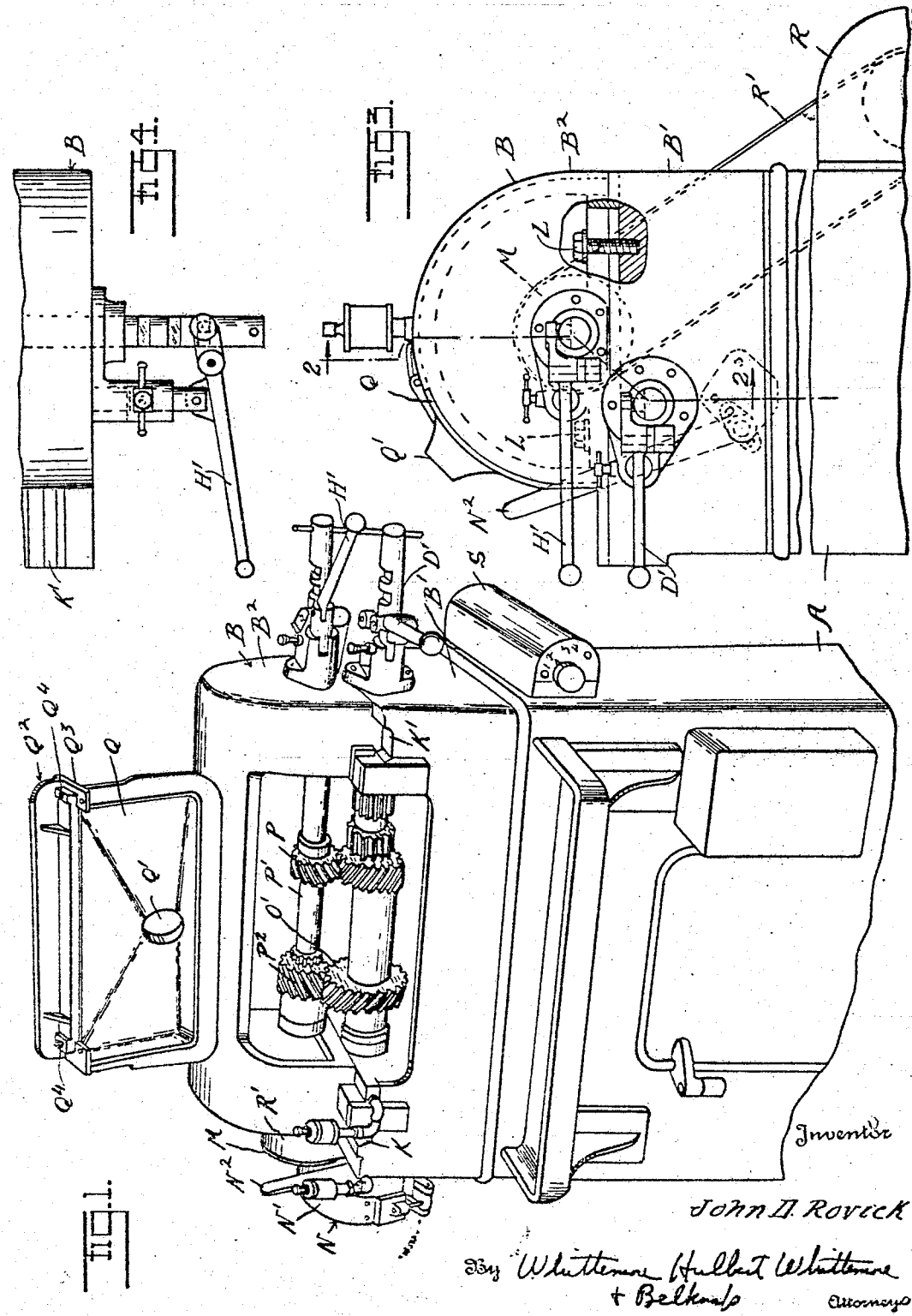
Figure 1 is a perspective view of the machine.
Figure 2:
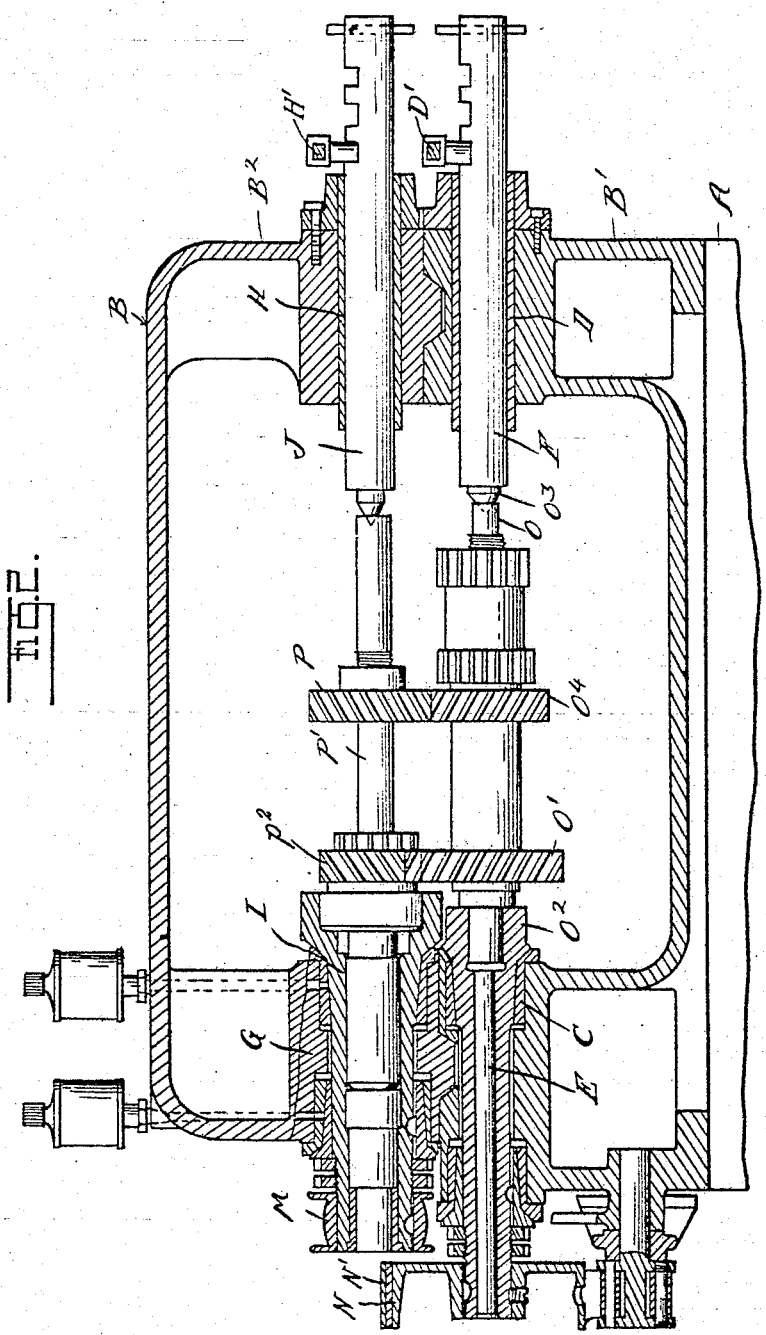
Figure 2 is a vertical longitudinal section in the plane of the arbors of the intermeshing gears taken on the line 2—2 of Figure 3.

My improved testing machine is particularly adapted for the convenient testing of gears which are to be used in transmission mechanisms. For such use the gears are frequently in groups or clusters mounted on a common shaft and it is therefore necessary to make provision for mounting such groups with a particular gear thereof in intermeshing relation with its mating gear. As the gears of a transmission are always enclosed in a housing, my improved machine is provided with a housing for enclosing the gears under test and this housing is provided with means for conducting the noise developed to an aperture forming a listening point. This will exclude other noises not caused by the gears under test and will magnify the gear noise so that faint sounds may be easily detected.

In detail, A is a suitable frame or standard on which the testing mechanism is mounted at a convenient height. B is a housing at the upper end of the frame A which is formed in lower and upper sections B', B² horizontally adjustable in relation to each other. The lower section B' is provided with bearings C and D for aligned spindles E and F. The upper section is similarly provided with bearings G and H for aligned spindles I and J. The distance between the axes of the spindles of the upper and lower sections may be altered by sliding the upper section B² forward or rearward with respect to the lower section B' and to permit of this these sections are provided with inter-engaging guideways as indicated at K and K'. Clamping bolts L are also provided for locking the sections in fixed relation at any desired point of adjustment.

The spindles E and I extend outward through the end wall of the housing, the latter having mounted on its projecting end a drive pulley M. On the other hand the spindle E has mounted on its projecting end a brake drum N and a brake strap N' engaging this drum and tensioned by a lever N² which engages the same and serves to place any desired load upon the spindle E. The spindles F and J extend outwardly through the opposite ends of the housing and are longitudinally adjustable in the bearings D and H by levers D' and H' respectively so as to engage gear arbors of different lengths when arranged between the aligned spindles. Thus as shown an arbor O extends between the spindles E and F engaging a socket O² in the one and a center O³ on the other. In a like manner, an arbor P' extends between the spindles I and J. The arbor O has secured thereto a cluster of gears including the gear O' and the gear O⁴. The arbor P' has secured thereto the gear P² and has rotatably mounted thereon the gear P, these gears P² and P being adapted to mesh with the gears O' and O⁴ respectively. By then adjusting the upper housing sections B² relative to the lower housing section B' the axes of these spindles are properly spaced to bring the gears in proper intermeshing relation, after which the bolts L are clamped to hold the parts in this relation.

With this arrangement the driving of the pulley M rotates the arbor P' and the gear P², the latter driving the intermeshing gear O' and the arbor O. The gear O⁴ on the arbor O drives in turn the gear P loosely mounted on the arbor P'. It should be understood, however, that this particular arrangement is merely illustrative and the machine is adapted for testing any other arrangement of gearing that it is desired to mount upon the arbors.

For access to the interior of the housing the front of the sections B' and B² is cut away a sufficient amount for the introduction and removal of the gears to be tested. This opening may then be closed by a lid Q hinged to the section B² and so fashioned as to form a funnel leading to a small opening Q' forming a listening point. Inasmuch as the sections B' and B² stand in varying relations to each other, the lid Q is provided with an adjustable portion Q² for closing the portion of the aperture in the section B'. This section Q² as shown is in the form of an angle bar secured to a horizontally extending shelf Q³ on the lid Q and held in different positions of adjustment by clamping bolts Q⁴.

For driving the gears, a motor, preferably an electric motor R, is mounted on the frame A and connected by a belt R' with the pulley M on the spindle I. A rheostat S also mounted on the frame A controls the speed of the motor thereby permitting of driving the spindle I at varying speeds.

In operation, the tester mounts the pair of gears to be tested, whether single gears or clusters, on arbors and then places these arbors in engagement respectively with the spindles E and I. If the distance between the axes of these spindles is not correct, the bolts L are loosened and the housing section $B^2$ is adjusted upon the housing section B' to produce the desired spacing between the spindles. The adjustable section $Q^2$ of the lid Q is also properly adjusted so that when the lid is closed it will completely fill the opening in the housing excluding all externally developed noises from entrance to the gear chamber. The machine is then set in operation, driving the intermeshing gears at varying speeds and the tester listening at the aperture Q' for the noise developed in operation. If the test is satisfactory, the gears are approved but if unsatisfactory, they are returned for correction.

In the machine as described above it is to be noted that the gears are completely enclosed within a housing. As previously set forth it is preferable to provide the funnel-shaped lead for directing the noises through the listening aperture Q', but it is to be understood that the machine may also be used for testing when the cover Q is in raised position. My invention in its broader phases contemplates any closed construction wherein the enclosing walls are so arranged as to cause the gear noise to be reflected back to the point where a listener may detect the same.

What I claim as my invention is:

1. A machine for testing noise in operation of intermeshing gears comprising a two-part housing for the gears to be tested, mountings for the intermeshing gears respectively in the two parts of said housing, means for adjusting one part of said housing in relation to the other to variably space the axes of said gears and means for conducting the noise of operation from said gears to a listening point.

2. A machine for testing noise in operation of intermeshing gears comprising a housing for the gears to be tested formed in two parts, adjustable in relation to each other, aligned spindles in one part for one of the gears to be tested, aligned spindles in the other part for the other of the intermeshing gears, means for adjusting the parts of said housing in relation to each other to variably space the axes of said spindles to obtain proper intermeshing relation between said gears, means for driving said gears and means for conducting the sound developed in operation to a listening point.

3. A machine for testing noise in operation of intermeshing gears comprising means for mounting the gears to be tested in intermeshing relation, said means including longitudinally adjustable spindles for the respective gears and means for adjusting said spindles to vary the distance between the axes thereof, means for running said gears in intermeshing relation and housing means enclosing said gears and provided with an opening constituting a listening point.

4. A machine for testing noise in operation of intermeshing gears comprising means for mounting the gears to be tested in intermeshing relation and a housing surrounding said gears to accentuate the noise of operation including a funnel leading to a small aperture forming a listening point.

5. A machine for testing noise in operation of intermeshing gears comprising means for mounting the gears to be tested in intermeshing relation, a housing surrounding said gears to accentuate the noise of operation and having an enlarged opening for insertion of said gears and a door for said enlarged opening having a funnel-shaped portion leading to an aperture constituting a listening point.

6. A machine for testing noise in operation of intermeshing gears comprising a two-part housing for the gears to be tested, said housing having an opening for the insertion of the gears to be tested, mountings for the intermeshing gears respectively in the two parts of said housing, means for adjusting one part of said housing in relation to the other to variably space the axes of said intermeshing gears thereby varying the size of said opening and a cover adapted to close said variable opening.

7. A machine for testing noise in operation of intermeshing gears comprising a two-part housing for the gears to be tested, said housing having an opening for the insertion of the gears to be tested, mountings for the intermeshing gears respectively in the two parts of said housing, means for adjusting one part of said housing in relation to the other to variably space the axes of said gears thereby varying the size of said opening, a cover hingedly mounted on one part of said housing and an adjustable section on said cover compensating for the variations in size of said opening.

8. A machine for testing noise in operation of intermeshing gears comprising a two-part housing for the gears to be tested, inter-engaging guideways on the respective parts of said housing permitting adjustment of one part relative to the other, aligned spindles in one part of said housing for receiving and mounting a gear arbor, aligned spindles in the other part of said housing for receiving and mounting another gear arbor, means for clamping said two parts when the gears on said arbors are in mesh, means for driving one of said gear arbors, means for resisting the rotation of the other of said arbors, the two parts of said housing having adjacent cut-away portions forming an enlarged opening for inserting said arbors, a cover for said opening hinged to one part of said housing and provided with an aperture constituting a listening point, and an adjustable section on said cover adapted to compensate for the variations in the size of said opening due to the adjustment of the two parts of said housing.

9. A machine for testing noise in operation of intermeshing gears comprising a two-part housing for the gears to be tested, said housing having an opening for the insertion of the gears to be tested, mountings for the intermeshing gears respectively in the two parts of said housing and means for adjusting one part of said housing in relation to the other to variably space the axes of said intermeshing gears.

10. A machine for testing noise in operation of intermeshing gears comprising means for mounting the gears to be tested in intermeshing relation, a housing surrounding said gears and adapted to accentuate the noise of operation and means outside of said housing having connection with said mounting means for releasing said gears from said mountings to facilitate successive testing of different gears.

11. A machine for testing noise in operation of intermeshing gears comprising means for mounting the gears to be tested in intermeshing relation, a housing surrounding said gears, means for conducting the noise developed within said housing to an aperture forming a listening point and means outside of said housing having connection with said mounting means for releasing said gears from said mountings.

JOHN D. ROVICK.